United States Patent

Burton et al.

[11] 3,908,516
[45] Sept. 30, 1975

[54] TIMING VALVE FOR MULTIPISTON HYDROSTATIC ENGINES

[75] Inventors: Keith F. Burton; Alan E. G. Wenbourne, both of Kent, England

[73] Assignee: Twin Disc, Incorporated, Racine, Wis.

[22] Filed: May 2, 1973

[21] Appl. No.: 356,519

[30] Foreign Application Priority Data
May 26, 1972 United Kingdom............... 24902/72

[52] U.S. Cl. .................................................. 91/476
[51] Int. Cl.² ........................................... F01B 3/00
[58] Field of Search ............ 91/476, 485, 499, 180; 417/273

[56] References Cited
UNITED STATES PATENTS

| | | | |
|---|---|---|---|
| 2,392,980 | 1/1946 | Fawkes | 91/180 |
| 2,625,914 | 1/1953 | Pressler | 91/180 |
| 2,967,520 | 1/1961 | Morris et al. | 91/485 |
| 2,969,810 | 1/1961 | Dudley | 91/485 |
| 3,074,345 | 1/1963 | Scheflow | 417/270 |
| 3,194,172 | 7/1965 | Schottler | 91/485 |
| 3,212,448 | 10/1965 | Johnston | 91/499 |
| 3,523,678 | 8/1970 | Wright | 91/499 |
| 3,696,710 | 10/1972 | Ortelli | 91/180 |

FOREIGN PATENTS OR APPLICATIONS

| | | | |
|---|---|---|---|
| 798,462 | 7/1958 | United Kingdom | 91/499 |
| 503,148 | 3/1938 | United Kingdom | 91/485 |

*Primary Examiner*—William L. Freeh
*Attorney, Agent, or Firm*—James E. Nilles

[57] ABSTRACT

The drive shaft of a multipiston hydrostatic engine has a piston actuated main excentric and a valve actuating auxiliary excentric in a 90° out of phase relationship to the main excentric. A circular, annularly channeled valve element is journaled on the auxiliary excentric between stationary port plates and controls the fluid flow to and from all the cylinders. An annular, axially loaded sealing device is operatively associated with the valve element in radial gap closing relation thereto so as to minimize fluid leakage past the valve element.

1 Claim, 10 Drawing Figures

TIMING VALVE FOR MULTIPISTON HYDROSTATIC ENGINES

BACKGROUND OF THE INVENTION

The invention relates to hydrostatic engines of the radial multipiston type, and it is concerned more particularly with a valve mechanism for controlling the flow of operating fluid to and from the cylinders of such engines.

Hydrostatic motors of the radial cylinder type have heretofore been known wherein driving torque is developed by means of a number of single acting pistons reciprocating within the cylinders, and an excentric on the motor shaft in cooperative engagement with the pistons. To control the flow of operating fluid to and from the cylinders of such motors different types of valve mechanisms have heretofore been suggested. A common feature of these prior art valve mechanisms is the provision of a second excentric on the drive shaft in 90° out of phase relation to the piston actuated excentric. In one type of such prior art valve mechanisms the second excentric is used to reciprocate a number of individual radial spool valves, one for each cylinder. In another type of prior art valve mechanisms the second excentric is used to actuate a single control element for all the cylinders. In that case a circular, annularly channeled valve plate, serving as the control element, is journaled on the second excentric between parallel stationary side plates, one being ported for connection to a source of fluid pressure, and the other being ported for connection to the cylinders.

The valve mechanism using only one control element has the advantage of being less complicated and using fewer parts than the mechanism using radial reciprocating spool valves. However, the single control element requires relatively large sealing surfaces and, as heretofore constructed and arranged, it has not been entirely satisfactory, particularly in the matter of minimizing fluid leakage from the high pressure side to the low pressure side of the valve mechanism.

SUMMARY OF THE INVENTION

The present invention provides an improved valve mechanism of the single valve plate type wherein fluid leakage from the high pressure side to the low pressure side is effectively minimized by means of an annular, axially loaded sealing device which is operatively associated with the valve plate in radial gap closing relation thereto.

More specifically, it is an object of the invention to provide an improved valve mechanism of the mentioned character wherein the sealing device is axially loaded by hydrostatic pressure of the admitted operating fluid.

A further object of the invention is to provide an improved valve mechanism of the above mentioned character wherein a radially fixed seal plate coating with the radially movable valve plate is subject to axial thrust in opposite directions by the hydrostatic pressure of the admitted operating fluid.

A still further object of the invention is to provide an improved valve mechanism of the mentioned character in which the radially fixed seal plate presents unequal radial surface areas at its opposite sides subject to the hydrostatic pressure of the admitted actuating fluid so as to produce a gap closing, axial thrust upon the valve plate.

A further object of the invention is to provide an improved valve mechanism of the mentioned character which minimizes fluid leakage from the high pressure side to the low pressure side of the mechanism irrespective of the direction in which the actuating fluid is passed through the mechanism.

The foregoing and other objects and advantages of the invention will become more fully apparent as this disclosure proceeds with reference to the accompanying drawings.

DRAWINGS

DETAILED DESCRIPTION

Figure 1:
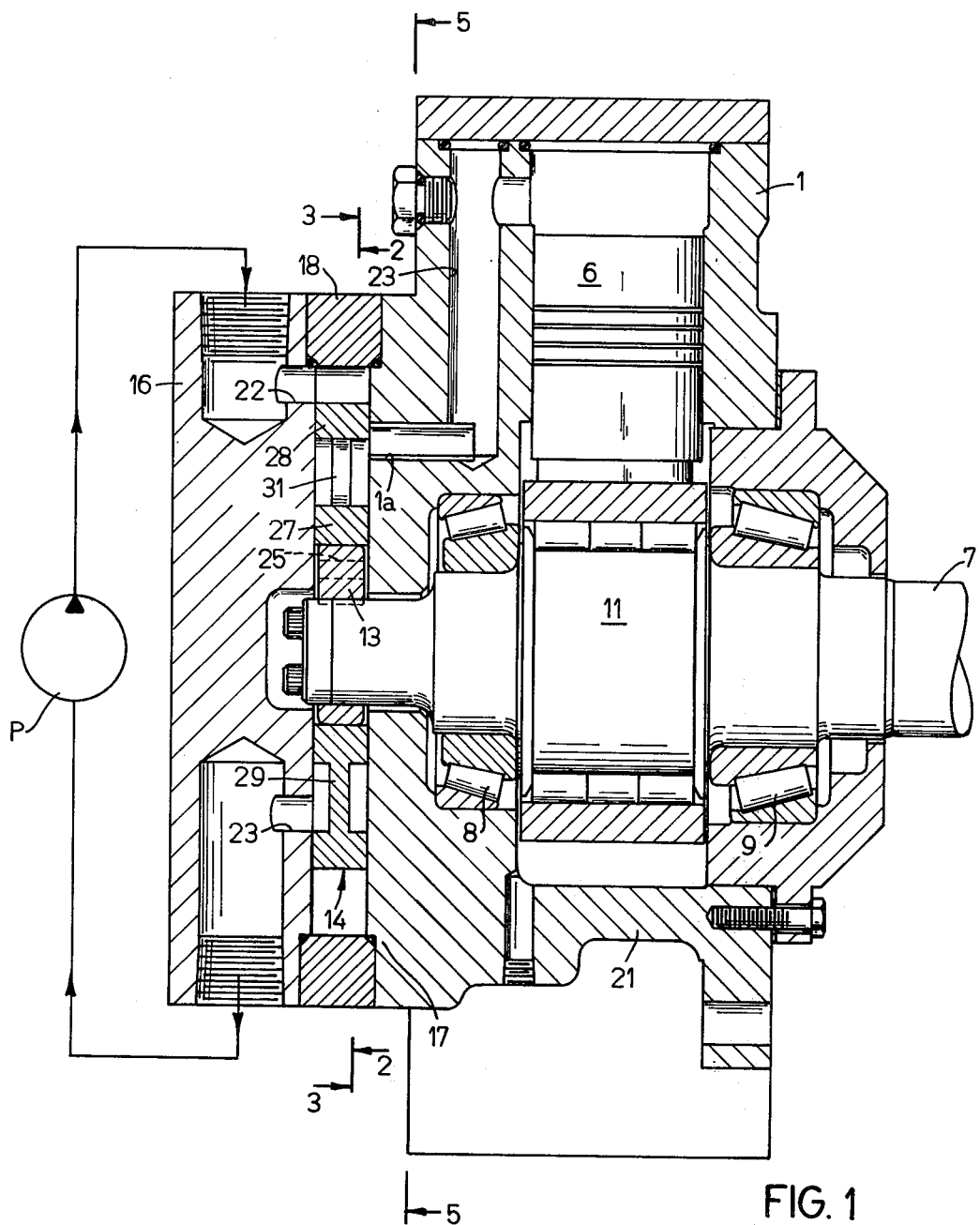
FIG. 1 is a vertical longitudinal section of a multipiston hydrostatic motor, a supply circuit for the operating fluid being schematically indicated at the valve side of the motor.
Figure 3:
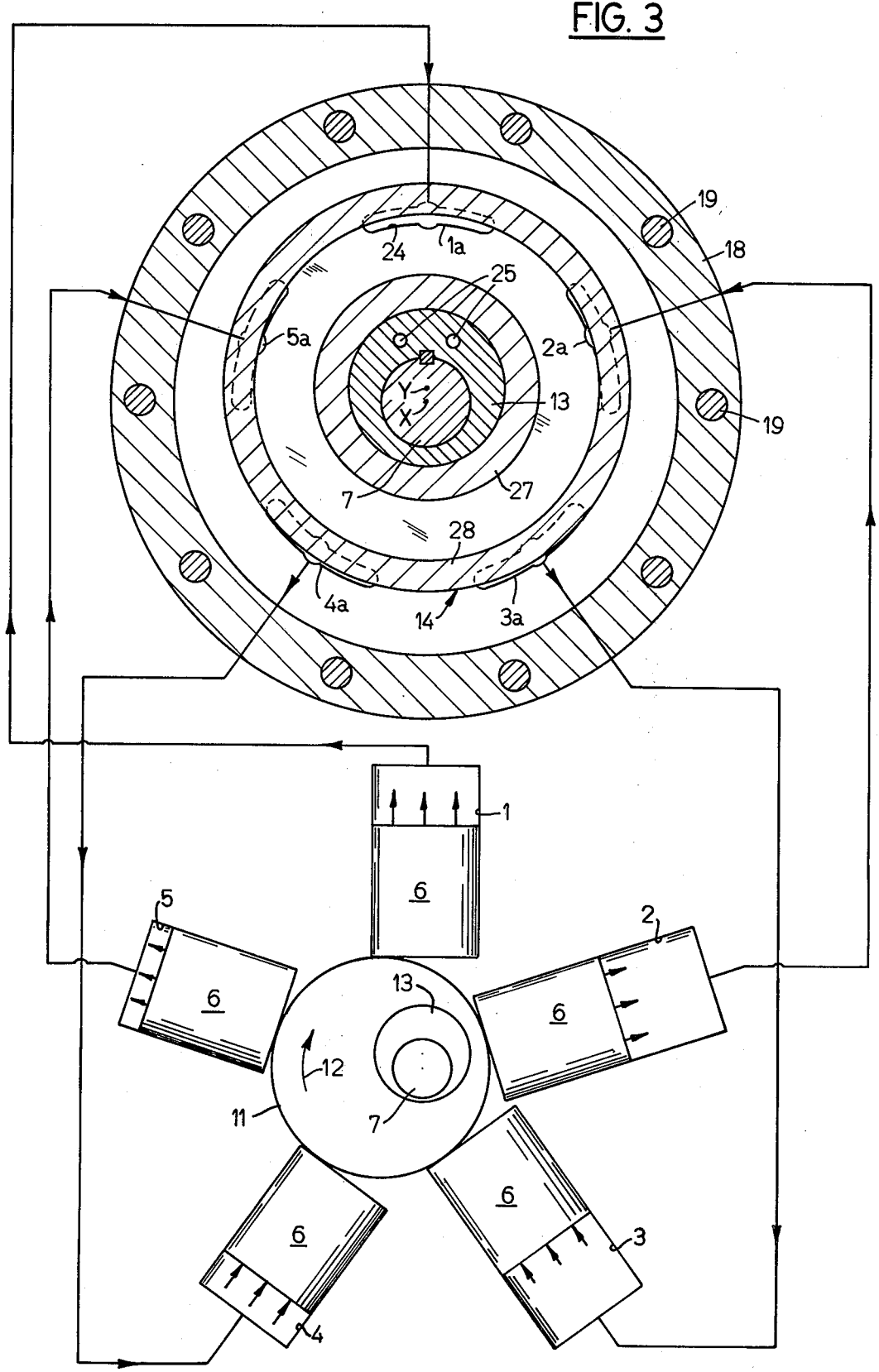
FIG. 3 is a section looking in the direction of arrows 3—3 in FIG. 1, and includes a schematic showing of the cylinders, pistons and internal fluid passages of the motor shown in FIG. 1.
Figure 5:
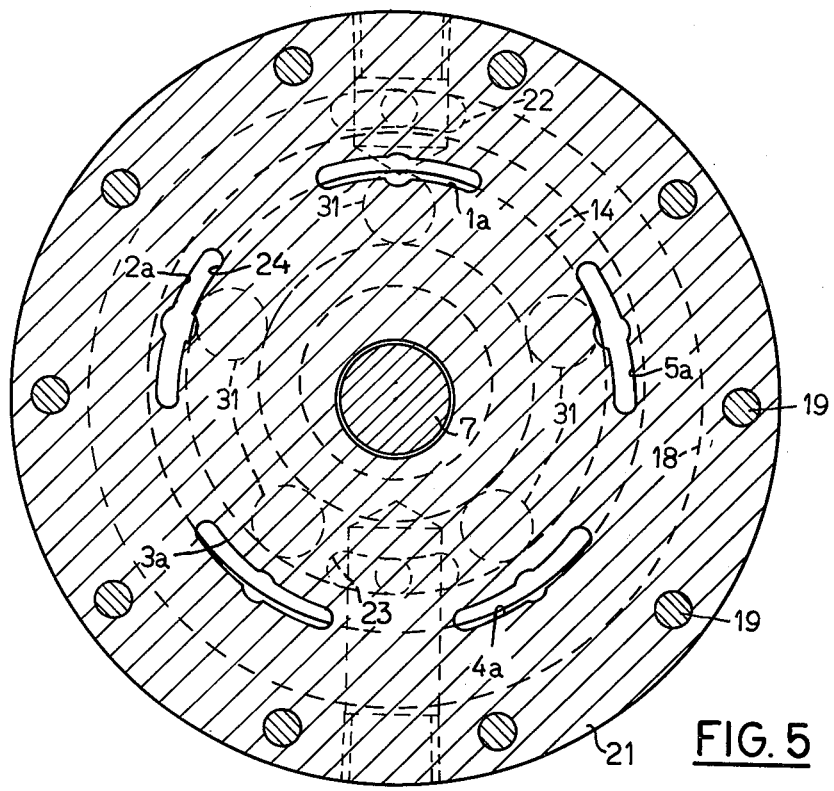
FIG. 5 is a section on line 5—5 of FIG. 1.

The hydrostatic motor shown in section in FIG. 1 and in outline in FIG. 3 comprises five conventional radial cylinders 1, 2, 3, 4 and 5 (FIG. 3); a piston 6 in each cylinder; and a drive shaft 7 journaled in roller bearings 8 and 9. The pistons 6 coact with a main excentric 11 of the shaft 7 in conventional manner to produce a driving torque in the direction of arrow 12 in FIG. 3 by controlled admission of operating fluid to and emission from the cylinders.

Figure 1A:
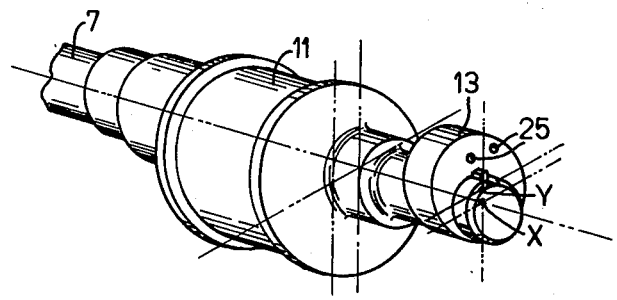
FIG. 1a is a perspective view showing the drive shaft of the hydrostatic motor shown in FIG. 1.

A valve mechanism for controlling the flow of operating fluid to and from the cylinders comprises an auxiliary excentric 13 (FIGS. 1a and 3) keyed to the shaft 7 in 90° out of phase relation to the main excentric 11, and a circular valve plate 14 (FIG. 1) journaled at its center on the excentric 13. The excentric 13 and the valve plate 14 are surrounded by an annular valve housing in axial alinement with the axis of rotation of the shaft 7. The valve housing has a ported axially outer side wall 16, a ported axially inner side wall 17 which also forms an end wall of the motor housing 21 and a circumferential wall formed by an annular spacer 18 between the side walls 16 and 17. A circumferential series of connecting bolts 19 (FIGS. 2–5) extend through the housing side walls 16, 17 and spacer 18 into tapped holes (not shown) of the motor housing 21.

An actuating fluid supply circuit includes a fluid pump P which is connected at its outlet and inlet sides with ports 22 and 23, respectively, of the housing side wall 16. The port 22 (FIG. 2) communicates with the interior of the valve housing near the inner peripheral wall of the spacer 18, and the port 23 communicates with the interior of the valve housing at a substantial radial distance from the inner peripheral wall of the spacer 18.

The housing side wall 17 has a circular series of five ports 1a–5a leading, respectively, through fluid passages to the cylinders 1–5 as schematically indicated in FIG. 3. FIG. 1 shows the port 1a and the fluid passage 23 connecting it with the blind end of the cylinder 1. As shown in FIG. 3, the ports 1a–5a are circularly arranged on a pitch circle around the axis X of the drive shaft 7. Each of the ports 1a–5a, is defined by a circularly curved slot 24 (FIG. 3) which is circularly enlarged midway between its ends and forms a fluid passage between the axially opposite sides of the housing side wall 17.

The valve plate 14 comprises a circular hub 27, an annular rim 28, and a radial web 29 connecting the hub 27 with the rim 28. The web 29 has a circular series of large holes 31 which connect an annular space between the hub 27 and the rim 28 at one side of the web 29 with an annular space between the hub and the rim at the other side of the web 29.

The hub 27 and the rim 28 are concentric with the axis Y (FIG. 3) of the excentric 13, and the radii from the axis Y to the inner and outer circumferential surfaces of the rim 28 are substantially equal to the radii from the shaft axis X to the radially innermost and radially outermost points of the circular enlargements of the slots 24. For lubricating purposes, the excentric 13 is provided with axial through passages 25.

Figure 2:
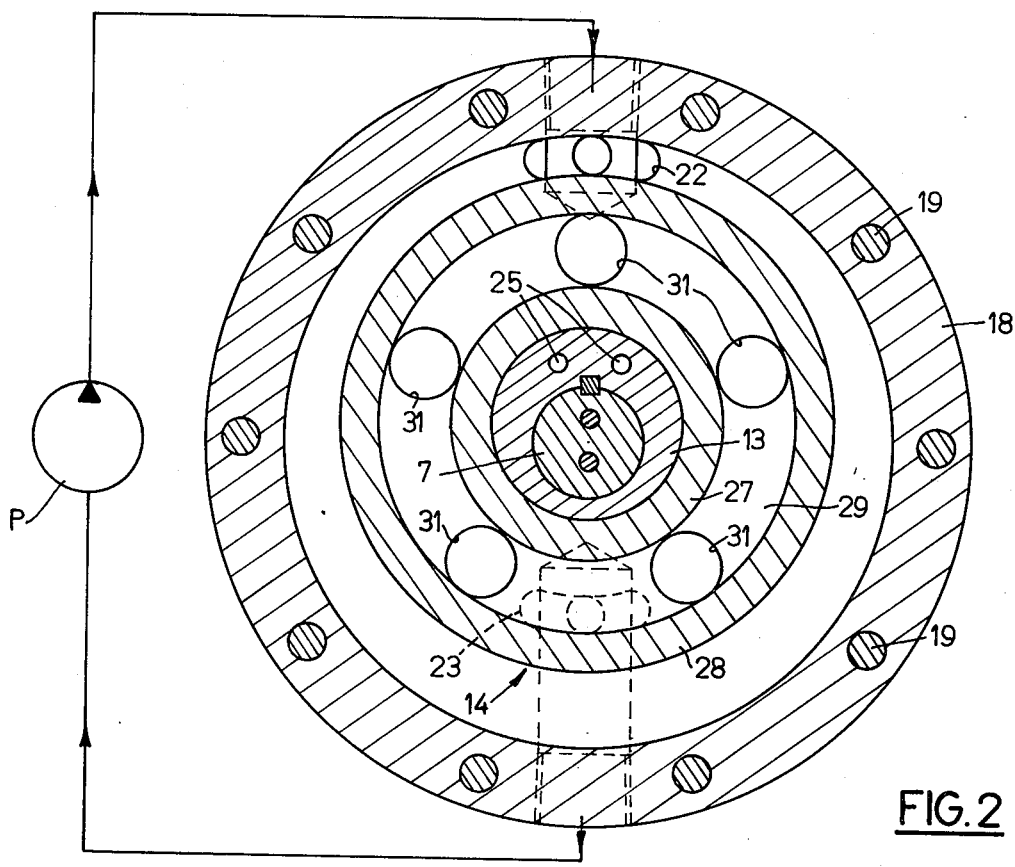
FIG. 2 is a section looking in the direction of arrows 2—2 in FIG. 1.

In the condition of the valve mechanism as illustrated by FIGS. 1–5, pressure fluid from the pump P enters the interior of the valve housing through the port 22 (FIG. 2) and accumulates in the crescent shape between the valve plate 14 and the spacer 18. From that crescent space, as shown in FIG. 3, the pressure fluid passes through the ports 3a and 4a to the cylinders 3 and 4, subjecting the drive shaft 7 to torque in the direction of arrow 12. As the shaft turns fluid is expelled from the cylinders 1, 2 and 5 through the ports 1a, 2a and 5a into the annular space between the hub 27 and rim 28 of the valve plate 14, from which it returns to the pump P via the port 23 (FIG. 2).

Figure 4:
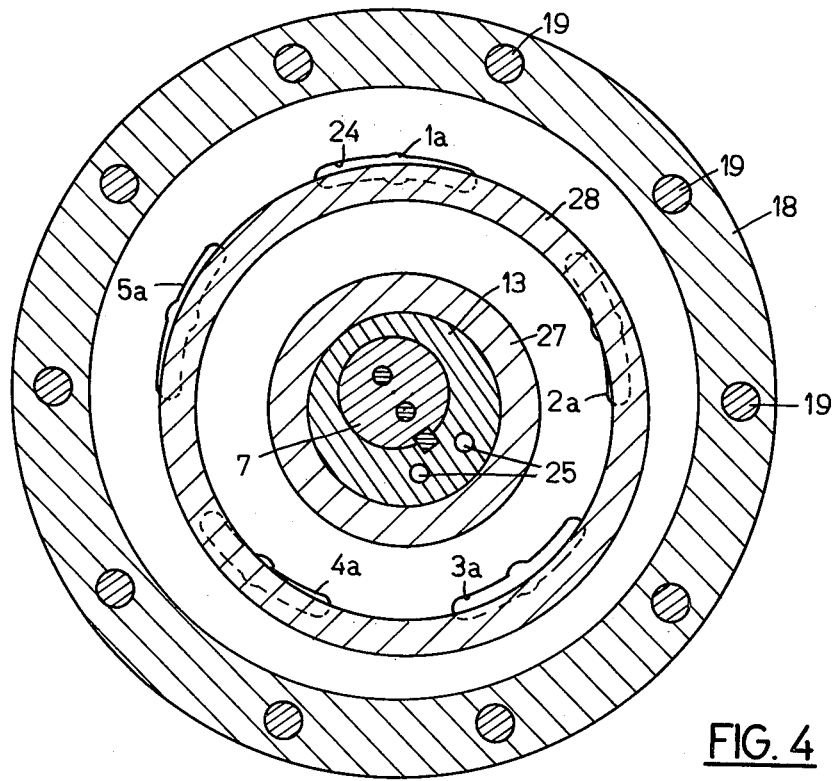
FIG. 4 is a section similar to FIG. 3 but showing the valve mechanism in a different position of adjustment.

A partial turn of the shaft 7 in the direction of arrow 12 from the position illustrated by FIG. 3, brings the valve mechanism to the condition illustrated by FIG. 4, in which the cylinders 1 and 5 are pressurized, and the cylinders 2, 3 and 4 are exhausted.

Figure 6:
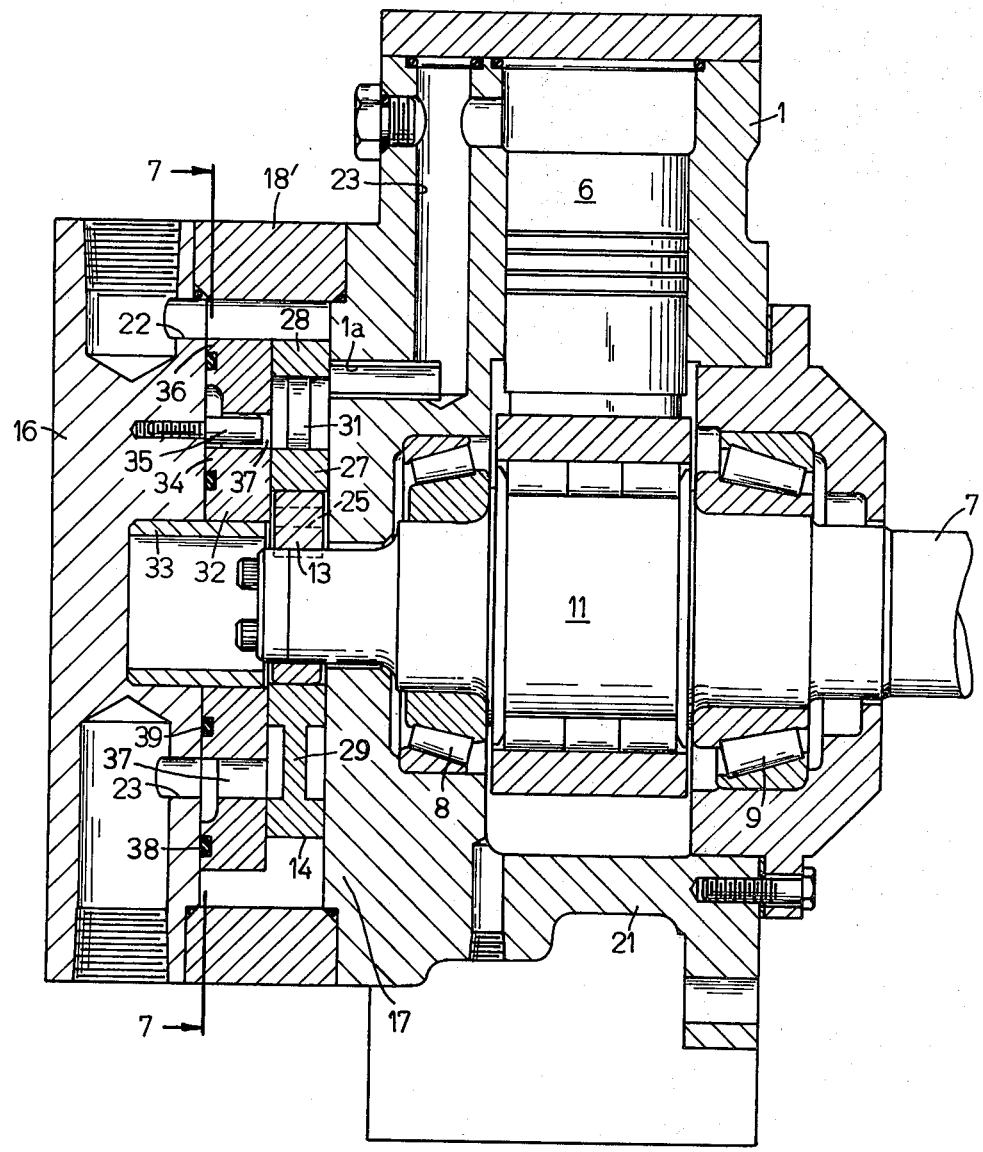
FIG. 6 is a sectional view similar to part of FIG. 1 and showing a valve mechanism embodying the invention.

FIG. 6 illustrates a valve mechanism incorporating the same valve plate and the same mode of operation as explained hereinbefore with reference to FIGS. 1–5, but including a seal arrangement for minimizing fluid leakage from the high pressure side to the low pressure side of the mechanism.

Figure 7:
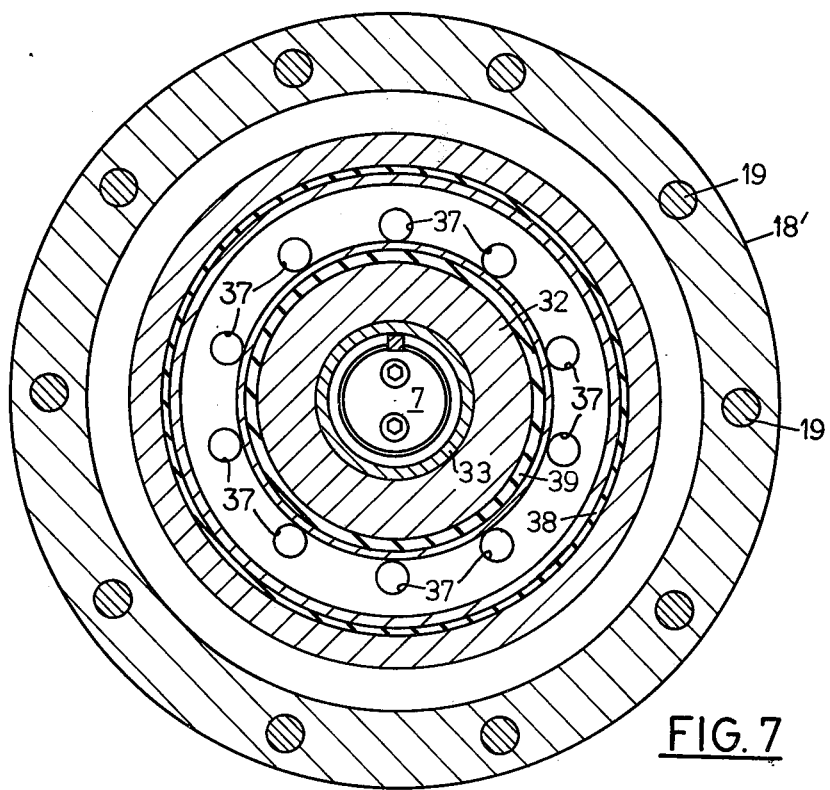
FIG. 7 is a section on line 7—7 of FIG. 6.

The housing side walls 16 and 17 in FIG. 6 correspond to the housing side walls 16 and 17 in FIG. 1, but are connected to a somewhat wider spacer 18' in order to make room for a radially fixed, axially apertured seal plate 32 between the housing side wall 16 and the valve plate 14. The seal plate 32 is circular (FIG. 7) and is supported coaxially with the drive shaft 7 on a bushing 33 extending axially inward from the housing side wall 16. At its side facing the housing side wall 16, the seal plate is annularly recessed to provide a circular, radially inner, axial thrust face 34, and a circular, radially outer, axial thrust face 36. A circular series of holes 37 extend axially through the seal plate 32 at radial distances from its center which will place the recess of the seal plate into permanent communication with the annular space between the hub 27 and the rim 28 of the valve plate 14. A dowel pin 35 on side wall 16 extends into one of the holes 37 to keep the seal plate 32 from rotating.

The recess of the seal plate 32 radially overlaps the port 23 of the housing side wall 16, and the outside diameter of the seal plate is somewhat larger than the outside diameter of the valve plate 14. This leaves a crescent shaped surface area at the axially inner side of the seal plate 32 exposed to fluid pressure in the crescent shaped space between the seal plate 14 and the spacer 18'. A circular groove in the thrust face 36 of the seal plate 32 contains a seal ring 38 of axially elastic material in contact with the inner face of the housing side wall 16, and a circular groove in the thrust face 34 of the seal plate contains a seal ring 39 of axially elastic material in contact with the inner face of the housing side wall 16.

There is a small clearance between the seal plate 32 and the housing side wall 16 so that hydraulic fluid can act on the seal plate 32 to urge it towards the valve plate 14 to prevent leakage between high and low pressure zones of the valve.

The relative areas of the seal plate 32 and the valve plate 14 are important for preventing leakage and will now be detailed together with operation of the valve.

With the port 22 acting as the high pressure inlet to the motor the operation of the valve is the same as explained with reference to FIGS. 1–5, except that the return path to outlet port 23 is also via the holes 37 and the axial recess in the seal plate 32. With such operation the difference in the areas of the seal plate 32 and the valve plate 14, plus the areas of the two partially open ports 4a and 3a should be less than the area between ring seal 38 and the circumference of the seal plate 32. This will provide a resultant sealing pressure of the seal plate 32 upon the valve plate 14 and prevent or at least reduce leakage between the high and low pressure sides of the rim 28 of valve plate 14 and leakage towards shaft 7 past the hub 27 of the valve plate 14.

The valve can also be utilized with port 23 as the high pressure inlet and port 22 as the low pressure outlet. With this arrangement the operational flow of the hydraulic fluid is merely the reverse of that explained previously. However, different relative areas of the seal plate 32 then become important. For this mode of operation the area of the circular channel between the hub 27 and the rim 28 of the valve plate 14 plus the areas of the partially open ports 1a, 2a and 5a should be less than the area contained between the ring seals 38 and 39 of the seal plate 32.

In either mode of operation, since the pressure to act on the seal plate 32 is provided by the hydraulic fluid actuating the motor the pressure is automatically reduced and increased with the demand of the motor.

Figure 8:
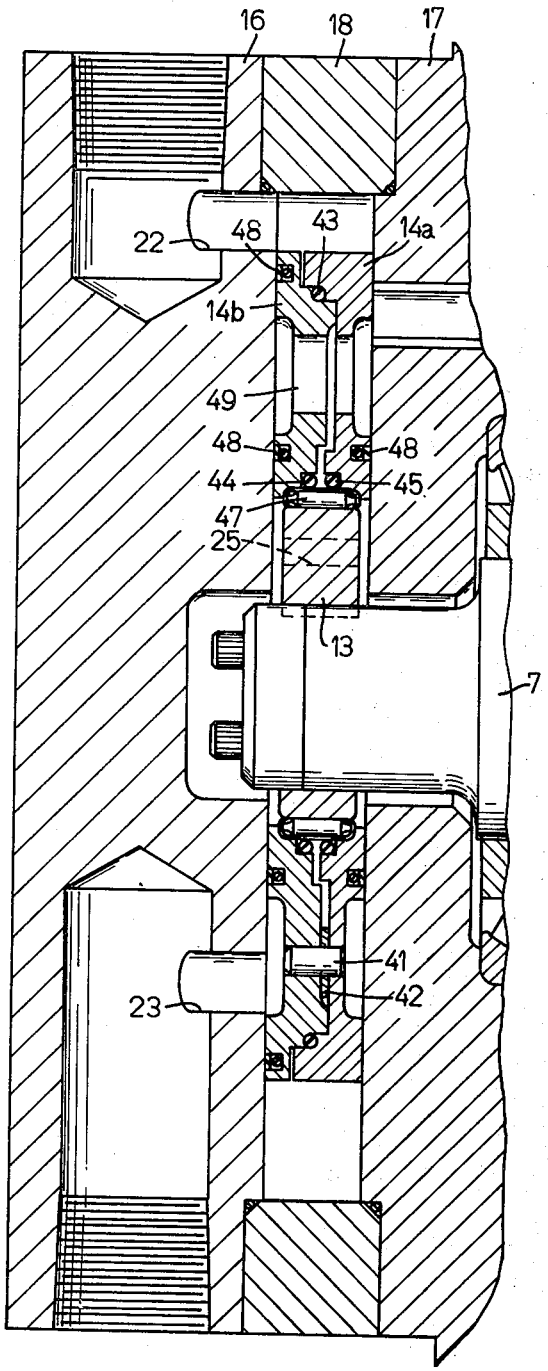
FIG. 8 is a sectional view showing a modified valve mechanism embodying the invention.

Referring now to FIG. 8 there is shown an alternative valve in which the single piece valve plate 14 is replaced by two interfitting annular members 14a and 14b which are secured against relative rotation by torque transmitting dowel pins 41 (one only shown) with a spring washer 42 interposed to ensure an initial spacing of members 14a and 14b and allow for wear. This arrangement includes a radially outer ring seal 43, and a pair of radially inner ring seals 44 and 45 between members 14a and 14b and the outer race of a needle bearing 47 mounting the members 14a and 14b on the excentric 13.

The interfitting annular members 14a and 14b provide a pair of coaxial valve rings which are rotatably centered on the auxiliary excentric 13 in axially shiftable relation thereto independently of each other, and in axially abutting, cooperative relation, respectively, to the ported axially inner and outer side walls 17 and 16 of the valve housing.

With the port 22 acting as the high pressure inlet, the ring seal 43 is so proportioned and positioned that the pressure acting in the space between members 14a and 14b radially outwardly of ring seal 43 is greater than the pressure which will act on the sealing faces of members 14a and 14b in attempting to provide a leakage path to low pressure channel 49. Alternately, with the port 23 acting as the high pressure inlet, the area of the space between ring seal 43, on the one hand, and ring seals 44 and 45 on the other hand, must be such that the pressure thereat tending to force the members 14a and 14b apart must be greater than the pressure acting on the axially outer sealing faces of members 14a and 14b attempting to provide leakage paths to low pressure portions of the valve.

Further face seals 48 are located on the faces of members 14a and 14b to assist in sealing. These preferably comprise metal filled polytetrafluoroethylene face seals backed with resilient ring seals.

The needle bearing 47 radially supports the valve rings 14a and 14b on the auxiliary eccentric 13 for rotation thereon and for axial shifting movement relative to each other. The ring seals 44 and 45 provide annular sealing means which are operatively associated with the needle bearing 47 and with the valve rings 14a and 14b so as to suppress radial inward passage of pressure fluid past relatively adjacent side surfaces of the valve ring hubs; and the ring seal 43 provides annular sealing means which are operatively interposed between the valve rings 14a and 14b so as to suppress radial inward and outward passage of pressure fluid past relatively adjacent side surfaces of the marginal portions of the valve rings.

Figure 9:
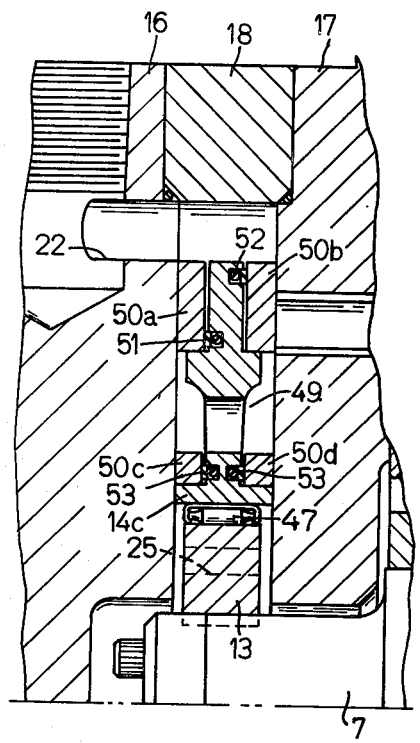
FIG. 9 is a sectional view showing another modified valve mechanism embodying the invention.

Referring now to FIG. 9 there is shown a cross-sectional view through half of another alternative valve in which the sealing means is provided by a circular plate member 14c by two valve rings 50a, 50b and by two sealing rings, 50c and 50d associated therewith. At its periphery, the plate member 14c has a lateral recess in which the valve ring 50a is located between plate 14c and housing side wall 16; and a ring seal 51 is radially so located between the valve ring 50a and the plate member 14c that with the port 22 at high pressure, the pressure between valve ring 50a and plate member 14c overcomes the pressure tending to provide a leakage path to channel 49. The valve ring 50b is similarly located between the other face of plate 14c and a housing side wall 17; and a seal ring 52 is radially so located between the 50b and the plate 14c that with the port 23 at high pressure, the pressure between member 14c and valve ring 50b overcomes the pressure tending to provide a leakage path from channel 49. The sealing rings 50c and 50d are located radially inwardly of channel 49, one of each axial outer face of member 14c. Ring seals 53 are located respectively therebetween such that the pressure therebetween, when port 23 is at high pressure, overcomes pressure tending to provide leakage paths to the shaft 7.

All the hydrostatically pressurized sealing means illustrated by FIGS. 6, 8 and 9, allow wear to take place without causing increased fluid leakage from the high to the low pressure zones of the valve.

We claim:

1. A timing valve for controlling the flow of operating fluid to and from the cylinders of a multipiston hydrostatic engine having a piston actuated main eccentric on its drive shaft, said valve comprising an auxiliary eccentric on said drive shaft in 90° out of phase relation to said main eccentric; a housing surrounding said auxiliary eccentric; a pair of one-piece valve rings each having a central hub portion surrounding said auxiliary eccentric and an annular marginal portion spaced radially from said hub portion; bearing means within said hub portion radially supporting said valve rings on said auxiliary eccentric for rotation thereon and for axial shifting movement relative to each other; annular sealing means operatively associated with said bearing means and valve rings so as to suppress radial inward passage of pressure fluid past relatively adjacent side surfaces of said hub portions; and annular sealing means operatively interposed between said valve rings so as to suppress radial inward and outward passage of pressure fluid past relatively adjacent side surfaces of said marginal valve ring portions; one of said valve rings being provided with a radially inner and a radially outer sealing surface in cooperative engagement with a ported axially outer side wall of said housing, and the other of said valve rings being provided with a radially inner and a radially outer sealing surface in cooperative engagement with a ported axially inner side wall of said housing.

* * * * *